United States Patent [19]

Beebe

[11] Patent Number: 5,161,366
[45] Date of Patent: Nov. 10, 1992

[54] GAS TURBINE CATALYTIC COMBUSTOR WITH PREBURNER AND LOW $NO_x$ EMISSIONS

[75] Inventor: Kenneth W. Beebe, Saratoga, N.Y.

[73] Assignee: General Electric Company, Schenectady, N.Y.

[21] Appl. No.: 509,401

[22] Filed: Apr. 16, 1990

[51] Int. Cl.⁵ ............................ F02C 7/26; F23R 3/40
[52] U.S. Cl. .................... 60/39.06; 60/39.5; 60/723
[58] Field of Search ............ 60/39.06, 723, 39.5, 60/733, 746

[56] References Cited

U.S. PATENT DOCUMENTS

| | | | |
|---|---|---|---|
| 2,636,342 | 4/1953 | Cade . | |
| 4,065,917 | 1/1978 | Pfefferle | 60/723 |
| 4,112,675 | 9/1978 | Pillsbury et al. | 60/723 |
| 4,118,171 | 10/1978 | Flanagan et al. | 60/723 |
| 4,285,193 | 8/1981 | Shaw et al. | 60/39 |
| 4,432,207 | 2/1984 | Davis, Jr. et al. | 60/723 |
| 4,473,536 | 9/1984 | Carberg et al. | 423/239 |
| 4,534,165 | 8/1985 | Davis, Jr. et al. | 60/39 |
| 4,726,181 | 2/1988 | Pillsbury | 60/39 |
| 4,731,989 | 3/1988 | Furuya et al. | 60/39 |
| 4,794,753 | 1/1989 | Beebe . | |
| 4,825,658 | 5/1989 | Beebe . | |
| 4,845,952 | 7/1989 | Beebe . | |

FOREIGN PATENT DOCUMENTS 0062149 10/1982 European Pat. Off. .
2132112 7/1984 United Kingdom .

*Primary Examiner*—Richard A. Bertsch
*Assistant Examiner*—Timothy S. Thorpe
*Attorney, Agent, or Firm*—Nixon & Vanderhye

[57] ABSTRACT

During low-load operating conditions, preburner combustion products are supplied with a chemical reactant to reduce $NO_x$. The preburner products of combustion are mixed with a hydrocarbon fuel in the presence of a combustion catalyst to ignite and initiate a catalytic combustion reaction. The preburner is then shut down. The fuel/air mixture supplied the catalytic reactor bed during the mid-load operating range of the turbine is sufficiently lean to produce a combustion reaction temperature too low to produce thermal $NO_x$. Thus, at low-load conditions, preburner combustion occurs with $NO_x$ reduction by chemical reactant, while the catalytic combustion occurs at mid-range operating conditions at temperatures too low to produce $NO_x$. For high-load operating conditions, the catalytic combustion occurs as previously described and additional lean fuel/air mixture is supplied the reaction zone whereby thermal $NO_x$ is likewise avoided.

9 Claims, 1 Drawing Sheet

GAS TURBINE CATALYTIC COMBUSTOR WITH PREBURNER AND LOW $NO_x$ EMISSIONS

BACKGROUND AND SUMMARY OF THE INVENTION

The present invention relates to apparatus and methods for reducing $NO_x$ emissions from a gas turbine and particularly relates to apparatus and methods for reducing $NO_x$ in a gas catalytic combustion system with preburner over the entire operating range of the gas turbine.

As set forth in my prior U.S Pat. No. 4,845,952, the objectives of many manufacturers of gas turbines include operating at high efficiency without producing undesirable air-polluting emissions. Conventional fuels normally used in gas turbines, when burned, typically produce oxides of nitrogen, carbon monoxide and unburned hydrocarbons.

$NO_x$ compounds are produced by the reaction of nitrogen in the air at the elevated temperatures conventionally found in combustors of gas turbines. $NO_x$ formation can be reduced by reducing maximum flame temperature in the combustor, for example, by introduction of steam. However, penalties to thermodynamic efficiency and increased capital costs are incurred. It is known to use a combustion catalyst in the reaction zone of a gas turbine combustion system to promote complete combustion of lean pre-mixed fuel and air to minimize the level of air-polluting emissions. Catalytic combustion occurs at a relatively low temperature insufficient to generate $NO_x$ from nitrogen and oxygen reactions which occur at higher temperatures. It will be appreciated, however, that when combustor inlet air temperature and temperature rise across the combustion system are too low to support catalytic combustion, a diffusion flame preburner may be used to obtain catalytic reactor ignition. That is, catalytic combustion alone cannot be used over the entire operating range of the gas turbine because the inlet air temperature and temperature rise across the combustion system are too low to initiate and sustain pre-mixed catalytic combustion during gas turbine ignition, acceleration and operating at the low end of the gas turbine load range.

When using a diffusion flame preburner, however, significant amounts of $NO_x$ emissions are generated. Prior catalytic combustion system designs do not include methods for reducing the preburner $NO_x$ emission. Consequently, while low $NO_x$ emissions are obtained over the mid-operating range of the gas turbine combustion system, prior catalytic combustion system designs do not include any method of reducing $NO_x$ emissions from the preburner. Accordingly, a purpose of the present invention is to provide a catalytic combustion system and method of preburner $NO_x$ abatement such that the catalytic combustion system may operate with extremely low $NO_x$ emissions over the entire operating range of the gas turbine.

According to the present invention, there is provided a catalytic combustor with a diffusion flame preburner for a gas turbine system for minimizing $NO_x$ emission throughout the operating range of the turbine. Three different operating modes for this combustion system are provided over the load range of the gas turbine. The first operating mode is a low-load operating condition of the gas turbine where only preburner combustion occurs with chemical/catalytic $NO_x$ removal, i.e., de$NO_x$. For example, hydrocarbon fuel may be supplied to a preburner start-up fuel nozzle and air may be directed to a preburner combustion zone. An electrical ignition device, such as a spark or glow plug, ignites the fuel/air mixture in the preburner combustion zone with the flame being stabilized by vortex recirculation generated by swirl vanes in the start-up fuel nozzle. Significant amounts of thermal $NO_x$ are generated by this diffusion flame reaction within the preburner combustion liner. To reduce this $NO_x$ to molecular nitrogen and water vapor, a chemical reactant, such as ammonia, urea, isocyanic acid or the like may be injected through the primary injector for the catalytic combustion section (used during mid and high-load operating ranges) into the preburner products of combustion. Mixing may be promoted by the infusion of nitrogen with the chemical reactant. The chemical reactant may also include enhancers to accelerate the rate of reaction with $NO_x$ from the diffusion flame preburner. The chemical reaction may occur within the catalytic reactor assembly liner and the catalytic reactor bed of the catalytic combustion zone, including the catalyst, to accelerate the de$NO_x$ chemical reactions.

In a second operating mode characterized as a mid-load operating range for the gas turbine, catalytic combustion occurs. To achieve this, fuel is supplied by the primary injector and mixed with the preburner products of combustion. This mixture enters the catalytic reactor bed which contains a combustion catalyst, for example, palladium. This mixture of fuel and preburner products of combustion ignites in the presence of the combustion catalyst at preburner discharge temperature. Once the combustion reaction has been initiated, the preburner may be shut down, with the reaction being sustained at compressor discharge air temperature. By introducing a lean fuel/air mixture into the catalytic reactor bed, combustion reaction temperature is maintained too low to produce thermal $NO_x$. The hydrocarbon fuel oxidation reactions go to completion in the reaction zone within the main combustion liner. Thus, the $NO_x$ emissions during low and mid-range operating conditions are substantially eliminated or minimized to ultra-low emissions.

At high load operating conditions for the gas turbine, a combination of catalytic and pre-mixed combustion is provided. The catalytic reactor operates in the same manner previously described as in the second operating mode, i.e., mid-range catalytic combustion. A secondary injector, however, is provided for mixing hydrocarbon fuel with compressor discharge air. This fuel/air mixture enters the reaction zone within the main combustion liner and is ignited by the hot products of combustion exiting the catalytic reactor bed. Because this fuel/air mixture is lean, combustion reaction temperature is likewise too low to produce thermal $NO_x$. In this manner, $NO_x$ emissions are substantially minimized or eliminated throughout the entire operating range of the gas turbine.

In a preferred embodiment according to the present invention, there is provided a method of operating a gas turbine catalytic combustion system having a preburner section and a catalytic combustion section to minimize or eliminate $NO_x$ emissions comprising the steps of combusting a fuel/air mixture in the preburner section, reducing the $NO_x$ resulting from the combustion of the fuel/air mixture in the preburner section, operating the preburner section to obtain catalytic reaction ignition and, upon ignition, operating the catalytic combustion section at a combustion temperature too low to produce $NO_x$ whereby $NO_x$ emissions from the gas turbine operation are substantially minimized or eliminated.

In a further preferred embodiment according to the present invention, there is provided a method of operating a gas turbine catalytic combustion system at low-load and mid-load ranges of gas turbine operation wherein the combustion system has a preburner section and a catalytic combustion section, comprising the steps of, at low-load operation, supplying a fuel/air mixture in the preburner section for combustion, reducing the $NO_x$ resulting from the combustion of the fuel/air mixture in the preburner section, operating the preburner section to obtain catalytic reactor ignition in the catalytic combustion section and, upon ignition and at mid-load range, operating the catalytic combustion section with a lean fuel/air mixture such that the combustion reaction temperature is too low to produce thermal $NO_x$ whereby $NO_x$ emissions from gas turbine operation at low and mid-load ranges of operation are substantially minimized.

In a still further preferred embodiment according to the present invention, there is provided a gas turbine catalytic combustion system with low $NO_x$ emissions comprising a preburned section, means for introducing fuel and air into the preburner section, an igniter in the preburner section for combusting the fuel/air mixture and means for reducing the $NO_x$ in the products of combustion of the preburner section. A catalytic combustion section is provided having a catalytic reactor bed having a catalyst and a reaction zone. Means are provided for introducing a lean mixture of fuel and air into the catalytic combustion bed with catalytic combustion occurring at least initially from ignition by the preburner products of combustion in the presence of the catalyst in the bed. Means are also provided for mixing compressor discharge air and fuel and supplying the mixture to the reaction zone of the combustion section for ignition by the hot products of combustion exiting the catalytic reactor bed.

Accordingly, it is a primary object of the present invention to provide novel and improved apparatus and methods for operating a catalytic combustion gas turbine system which achieves ultra-low $NO_x$ emissions over the entire operating range of the gas turbine.

These and further objects and advantages of the present invention will become more apparent upon reference to the following specification, appended claims and drawings.

BRIEF DESCRIPTION OF THE DRAWING FIGURES

FIG. 1 is a schematic cross-sectional illustration of a catalytic combustor forming part of a gas turbine and constructed in accordance with the present invention; and FIG. 2 is a cross-sectional view thereof taken generally about on line 2—2 in FIG. 1.

DETAILED DESCRIPTION OF THE DRAWING FIGURES

Reference will now be made in detail to the present preferred embodiment of the invention, an example of which is illustrated in the accompanying drawings.

As well known, a gas turbine includes a compressor section, a combustion section and a turbine section. The compressor section is driven by the turbine section through a common shaft connection. The combustion section typically includes a circular array of a plurality of circumferentially spaced combustors. A fuel/air mixture is burned in each combustor to produce the hot energetic flow of gas which flows through a transition piece for flowing the gas to the turbine blades of the turbine section. Thus, for purposes of the present description, only one combustor is illustrated, it being appreciated that all of the other combustors arrayed about the turbine are substantially identical to the illustrated combustor.

Figure 1:
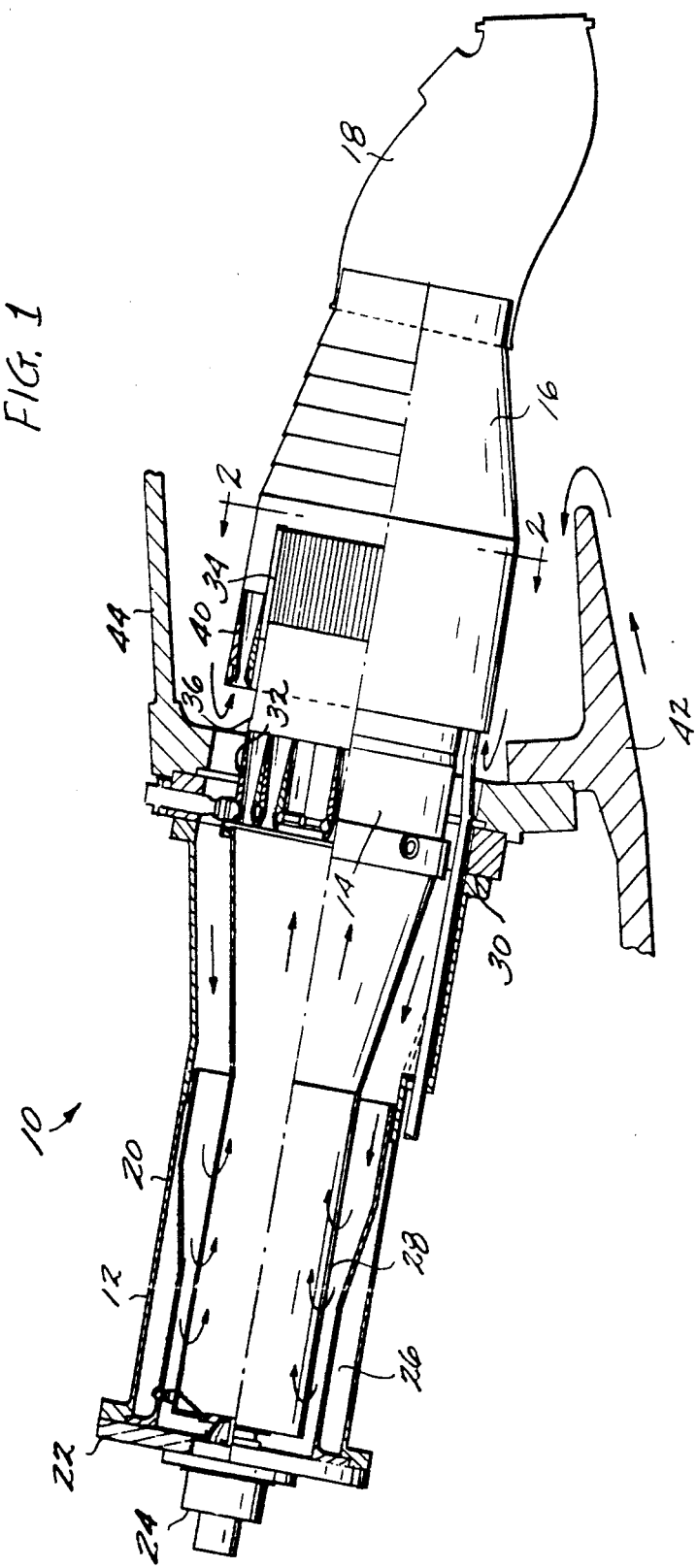
Figure 2:
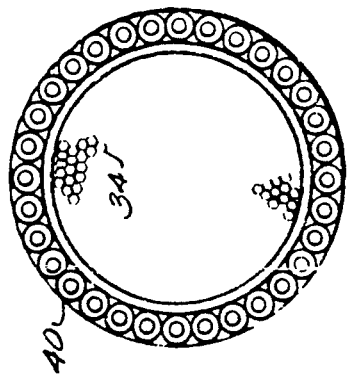

Referring now to FIG. 1, there is shown generally at 10, a combustor for a gas turbine engine and including a preburner section 12, a catalytic reactor assembly 14, a main combustion assembly 16 and a transition piece 18 for flowing hot gases of combustion to the turbine blades not shown. The preburner assembly 12 includes a preburner casing 20, an end cover 22, a start-up fuel nozzle 24, a flow sleeve 26 and a pre-combustion liner 28 within sleeve 26. An ignition device, not shown, is provided and may comprise a spark or glow plug. Combustion in the preburner assembly 34 occurs within the combustion liner 28. Preburner combustion air is directed within liner 28 via flow sleeve 26 and enters the combustion liner through a plurality of holes formed in the liner. The air enters the liner under a pressure differential across liner 28 and mixes with fuel from fuel nozzle 24 within liner 28. Consequently, a diffusion flame combustion reaction occurs within liner 28, releasing heat for purposes of driving the gas turbine.

The catalytic combustion zone includes the reactor assembly 14 and combustion assembly 16. In that zone, there is provided an annular support ring 30 which supplies hydrocarbon fuel to an injector 32. For example, this might take the form of the multiple Venturi tube gas fuel injector described and illustrated in my U.S. Pat. No. 4,845,952, the disclosure of which is incorporated herein by reference. Thus, the mixture of hydrocarbon fuel and preburner products of combustion enters the catalytic reactor bed via the catalytic reactor assembly liner 36. The catalytic reactor bed 34 is generally cylindrical in shape and may be formed from a ceramic material or substrate of honeycombed cells coated with a reaction catalyst on their surfaces. The reaction catalyst may, for example, comprise palladium. The structure of the catalytic reactor bed 34 may be as described and illustrated in my U.S. Pat. No. 4,794,753, the disclosure of which is incorporated herein by reference. Thus, the mixture of fuel and preburner products of combustion ignites in the presence of the combustion catalyst at preburner discharge temperature. The fuel/air mixture entering catalytic reactor bed 34 is very lean and the hydrocarbon fuel oxidation reactions go to completion in the reaction zone within the main combustion assembly 16.

For operating at high-load conditions for the gas turbine, there is provided a secondary fuel injector 40 comprised of a plurality of Venturi tubes for mixing hydrocarbon fuel and compressor discharge air flow thereto from a plenum formed by compressor discharge casing 42 and combustion wrapper 44. This secondary fuel/air mixture enters the reaction zone 16 and is ignited by the hot products of combustion exiting the catalytic reactor bed 34.

In operation of the gas turbine, there are three distinct operating modes depending upon the load range on the gas turbine. The first operating mode is at low turbine loads and during initial start-up. In this mode, hydrocarbon fuel is supplied to start-up fuel nozzle 24 and preburner combustion air is provided to liner 28 through the plurality of liner openings for mixing with the fuel from the start-up fuel nozzle. A diffusion flame combustion reaction occurs within the preburner combustion liner 28 which is initiated by a spark or glow plug. To reduce the significant amount of thermal $NO_x$ generated in the preburner combustion liner 28, a chemical reactant, for example, ammonia, urea or isocyanic acid, is provided for injection by and through the primary injector 32. The primary injector 32 mixes the chemical reactant with the preburner products of combustion. Mixing may be promoted by using an inert carrier gas, such as nitrogen, with the chemical reactant. The chemical reactant may also include enhancers to accelerate the rate of chemical reaction with the $NO_x$ from the diffusion flame preburner assembly. The de$NO_x$ chemical reaction then occurs within the catalytic reactor assembly liner and the catalytic reactor bed 34 which may include a catalyst to accelerate those reactions. Consequently, significantly reduced $NO_x$ emissions obtain from operation of the preburner at low-load operating conditions.

At mid-range operating conditions, hydrocarbon fuel is supplied to injector 32. The injector 32 mixes the hydrocarbon fuel with the preburner products of combustion and this mixture enters the catalytic reactor bed 34 via the catalytic reactor assembly liner 36. The mixture of fuel and preburner products of combustion ignites in the presence of the combustion catalyst. Once the combustion reaction has been initiated, the preburner may be shut down, with the reaction being sustained at compressor discharge temperatures. Because the fuel/air mixture entering the catalytic reactor bed 34 is lean, the combustion reaction temperature is too low to produce thermal $NO_x$. The hydrocarbon fuel oxidation reactions go to completion in the reaction zone within the main combustion assembly liner 16. Thus, during mid-range load conditions, the temperature of the combustion reaction is too low to produce $NO_x$.

Under high-load conditions, catalytic combustion is carried on as described above. Additionally, hydrocarbon fuel is supplied the secondary injector 40. Injector 40 mixes the fuel with the compressor discharge air contained in the plenum formed between the discharge casing 42 and the combustion wrapper 44. This fuel/air mixture enters the reaction zone within the main combustion liner 16 and is ignited by the hot products of combustion exiting the catalytic reactor bed 34. Because the fuel/air mixture entering the main combustion liner 16 is lean, the combustion reaction temperature is likewise too low to produce thermal $NO_x$.

Consequently, it will be appreciated that $NO_x$ emissions are substantially minimized or eliminated throughout the entire operating range of the gas turbine. This has been accomplished simply and efficiently and by a unique cooperation of essentially known gas turbine elements. Importantly, the $NO_x$ emissions have been minimized or eliminated at the low end of the operating range, i.e., when using only the preburner. Also, it has been accomplished using elements, i.e., the primary injector, extant in gas turbines of this type.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of operating a gas turbine catalytic combustion system at start-up, and low-load and mid-load ranges of gas turbine operation wherein the combustion system comprises a combustor having a preburner section and a catalytic combustion section to minimize or eliminate $NO_x$ emissions comprising the steps of:
   at start-up and low-load operation, combusting a fuel/air mixture in the combustor preburner section;
   reducing the $NO_x$ resulting from the combustion of the fuel/air mixture in the combustor preburner section during start-up and low-load operation by combining the products of combustion of the preburner section with a chemical reactant to reduce $NO_x$ at an operating condition where products of combustion of the preburner section are at a temperature too low for catalytic combustion;
   operating the preburner section to obtain catalytic reaction ignition; and
   upon ignition, operating the catalytic combustion section at a combustion temperature too low to produce $NO_x$ whereby $NO_x$ emissions from said gas turbine operations are substantially minimized or eliminated.

2. A method according to claim 1 including the step of shutting down the preburner combustion section once catalytic combustion occurs in the catalytic combustion chamber.

3. A method according to claim 1 wherein a primary fuel injector is provided for supporting combustion in the catalytic combustion section and including the further steps of introducing the chemical reactant through the primary fuel injector into the combustion products of the preburner section during preburner operation and subsequently introducing fuel through the primary fuel injector for combustion in the catalytic combustion section during catalytic combustion operation.

4. A method according to claim 1 including catalytically accelerating the chemical reaction reducing $NO_x$.

5. The method according to claim 1, wherein the step of combining the products of combustion of the preburner section with a chemical reactant includes introducing the chemical reactant into the catalytic combustion section, and catalytically accelerating the chemical reaction, reducing $NO_x$.

6. A gas turbine catalytic combustion system with low $NO_x$ emissions comprising:
   a preburner section;
   means for introducing fuel and air into the preburner section;
   an igniter in said preburner section for combusting the fuel/air mixture;
   means for reducing the $NO_x$ in the products of combustion of said preburner section including injector means for introducing a chemical reactant into the products of combustion of said preburner section;
   a catalytic combustion section having a catalytic reactor bed having a catalyst and a reaction zone;
   means including said injector means for introducing a lean mixture of fuel and air into the catalytic combustion bed with catalytic combustion occurring at least initially from ignition by the preburner products of combustion in the presence of the catalyst in the bed; and means for mixing compressor discharge air and fuel and supplying said mixture to the reaction zone of the combustion section for ignition by the hot products of combustion exiting the catalytic reactor bed.

7. A method of operating a gas turbine catalytic combustion system having a preburner section and a catalytic combustion section to minimize or eliminate $NO_x$ emissions comprising the steps of:

combusting a fuel/air mixture in the preburner section;

reducing the $NO_x$ resulting from the combustion of the fuel/air mixture in the preburner section by combining the products of combustion of the preburner section with a chemical reactant to reduce $NO_x$ at an operating condition where products of combustion of the preburner section are at a temperature too low for catalytic combustion;

operating the preburner section to obtain catalytic reaction ignition;

upon ignition, operating the catalytic combustion section at a combustion temperature too low to produce $NO_x$ whereby $NO_x$ emissions from said gas turbine operations are substantially minimized or eliminated; and supplying a fuel/air mixture into a zone for ignition by the hot products of combustion from the catalytic combustion section at a combustion temperature too low to produce $NO_x$.

8. A method according to claim 7 wherein the turbine includes a reaction zone forming part of the catalytic combustion section in which fuel oxidation reactions go to completion and a compressor having an air discharge and wherein the steps of supplying the fuel/air mixture includes combining air from the compressor discharge with fuel and injecting such fuel/air mixture into the reaction zone of the catalytic combustion section.

9. A method according to claim 7 wherein a primary fuel injector is provided for supporting combustion in the catalytic combustion section and including the further steps of introducing the chemical reactant through the primary fuel injector into the combustion products of the preburner section during preburner operation and subsequently introducing fuel through the primary fuel injector for combustion in the catalytic combustion section.

* * * * *